W. H. COOLEY & H. E. MARKS.
THILL FOR WAGONS, CARRIAGES, &c.
APPLICATION FILED JUNE 27, 1907.
914,553.
Patented Mar. 9, 1909.
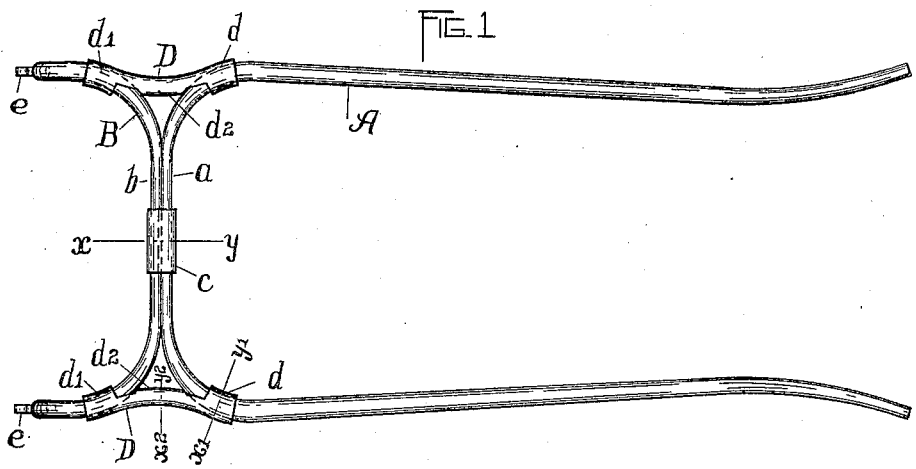
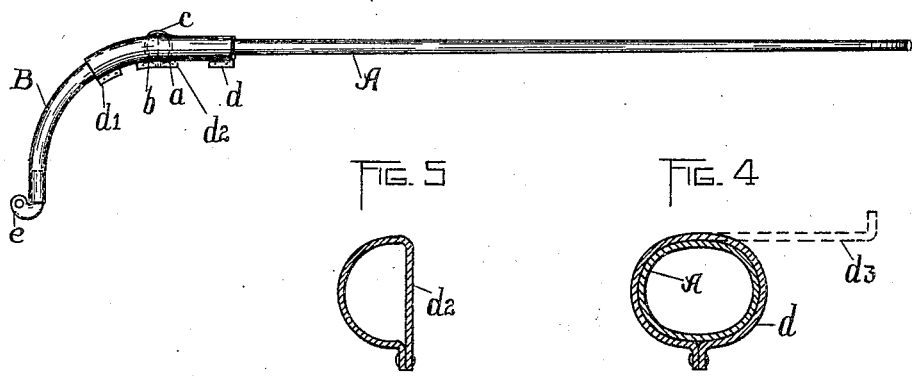
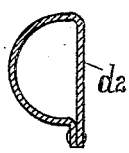
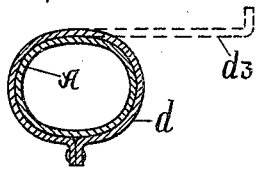
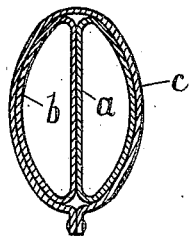
WITNESSES:
Osborne F. Gurney
Lottie Wood
INVENTORS,
Wm. H. Cooley
and
Herbert E. Marks
by Wm. H. Cooley ATTY

UNITED STATES PATENT OFFICE.

WILLIAM H. COOLEY, OF BROCKPORT, AND HERBERT E. MARKS, OF POUGHKEEPSIE, NEW YORK.

THILL FOR WAGONS, CARRIAGES, &c.

No. 914,553.    Specification of Letters Patent.    Patented March 9, 1909.

Application filed June 27, 1907. Serial No. 381,063.

*To all whom it may concern:*

Be it known that we, WILLIAM H. COOLEY and HERBERT E. MARKS, citizens of the United States, and residents, respectively, of Brockport, Monroe county, and Poughkeepsie, Dutchess county, State of New York, have invented a new and Improved Thill for Wagons, Carriages, &c., of which the following is a specification.

The object of our present invention is to provide a construction for wagon thills in which the thills proper shall consist of two principal tubular elements, each integrally formed, with means for properly connecting such elements together; that is, the two shafts are formed integrally of one tube and the axle-engaging member is formed of another tube and such tubular elements are connected by clips adapted to securely hold them together in proper relation.

The accompanying drawings illustrating our invention are as follows:—

Figure 1 is a top view and Fig. 2 is a side view of a pair of shafts or thills constructed in accordance with our invention. Fig. 3 is a transverse section of the parts taken along the line $x$—$y$ of Fig. 1, while Figs. 4 and 5 are similar sections taken along the lines $x^1$—$y^1$ and $x^2$—$y^2$ of Fig. 1.

Similar letters refer to similar parts throughout the several views of the drawings.

Referring to the drawings,—our thills are constructed as follows:—

A is the tubular member bent up to the U form indicated and comprises the shafts proper, while B is also an integrally formed tube in the ends of which there are secured the eye pieces $e$ adapted to engage and be secured within the usual clips on the front axle of the carriage or wagon by bolts in the usual way.

The sections $a$ and $b$ of the tubes A and B are flattened where they come together, as indicated in Figs. 1 and 3, and are secured together with their flat surfaces adjacent to each other by means of the encircling clip $c$, to which the usual whiffle-tree may be secured in any desired way. The tubular sections A and B are also secured together by means of the clips D having members $d$ and $d^1$ adapted to encircle the tubular members A and B respectively at the points indicated in Figs. 1 and 2, such clips D being formed, as clearly indicated in Fig. 4, with engaging members extending outward tangentially, as indicated in dotted lines at $d^3$ in Fig. 4, while the parts are being inserted in place and then such member $d$ is bent around the tube A and secured by means of rivets passing through the downwardly projecting flanges formed on the clip D and the encircling member $d$. The clip D is similarly secured to the tube B by means of an encircling member $d^1$. The portion $d^2$ of the clip D lying between the tubes B and A is formed, as indicated in Fig. 5, with a downwardly projecting member adapted to extend downwardly and engage between the tubes B and A and is secured by means of rivets, as indicated in Fig. 5, to the flange on the under side of the clip D.

The eye pieces $e$ are preferably fitted closely to the bore of the ends of the tubular members B and when inserted therein they may be secured by means of rivets or similar means.

The method of assembling of the parts of and of attaching and using our thills and the coöperation of the parts thereof it is believed are sufficiently explained in the above description.

What we claim is:—

1. A pair of thills for wagons, carriages, etc., comprising two main members of general U-shape conformation, one of such members constituting the shafts proper and the other adapted at its ends to engage the clips on the front axle of the wagon, such U-shaped members having their central portions secured together by means of an encircling clamping member and being also secured together at their corners by means of connecting and bracing clips having members thereon adapted to engage around and be secured to such U-shaped members, such U-shaped members flattened to present approximately plane adjacent surfaces.

2. A pair of thills for wagons, carriages etc., comprising shafts integrally formed from a single tube bent to an elongated U-shape and an attaching and supporting member bent approximately to a shortened U-shape and having ends adapted to engage and be secured to the front axle of the wagon and means for rigidly securing such members together.

3. A pair of thills for wagons, carriages, etc., comprising two main tubular members each one integrally formed and of general U-shape conformation, one of such members constituting the shafts proper and the other adapted to be secured to the front axle of the wagon, such U-shaped members secured together at their central portions by means of an encircling clamping member and at their divergently curved corners by means of connecting and bracing clips engaging around and secured to such U-shaped members.

4. A pair of thills for wagons, carriages etc., comprising two main tubular members each one integrally formed and of general U-shape conformation, one of such members constituting the shafts proper and the other adapted to be secured to the front axle of the wagon, such U-shaped members secured together at their central portions by means of an encircling clamping member and at their divergently curved corners by means of connecting and bracing clips engaging around and secured to such U-shaped members, such U-shaped members flattened to present approximately plane adjacent surfaces.

5. A pair of thills for wagons, carriages, etc., comprising shafts integrally formed from a single tube bent to an elongated U-shape and an attaching and supporting member bent approximately to a shortened U-shape and having curved ends adapted to be secured to the front axle of the wagon and means for holding such integrally formed U-shaped members together and for preventing a bending movement or displacement between such members.

WM. H. COOLEY.
HERBERT E. MARKS.

Witnesses:
   OSBORNE F. GURNEY,
   LOTTIE WOOD.